(12) United States Patent
Bachmaier et al.

(10) Patent No.: US 6,853,114 B2
(45) Date of Patent: Feb. 8, 2005

(54) CONVERTER CIRCUIT

(75) Inventors: Georg Bachmaier, München (DE);
Bernhard Fischer, Töging A. Inn (DE);
Andreas Kappel, Brunnthal (DE);
Enrico Ulivieri, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/809,647

(22) Filed: Mar. 25, 2004

(65) Prior Publication Data

US 2004/0184291 A1 Sep. 23, 2004

Related U.S. Application Data

(63) Continuation of application No. PCT/DE02/03496, filed on Sep. 17, 2002.

(30) Foreign Application Priority Data

Sep. 25, 2001 (DE) .......................................... 101 47 168

(51) Int. Cl.⁷ .......................... H01L 41/08; F02M 51/00
(52) U.S. Cl. .................. 310/316.03; 310/317; 123/478; 123/498
(58) Field of Search ................................ 323/271, 262, 323/222, 235; 310/316.02, 316.03, 317, 319; 123/478, 498, 620, 642

(56) References Cited

U.S. PATENT DOCUMENTS

| | | | | |
|---|---|---|---|---|
| 4,736,151 A | | 4/1988 | Dishner ..................... 323/224 |
| 4,947,074 A | * | 8/1990 | Suzuki ................... 310/316.03 |
| 5,057,986 A | | 10/1991 | Henze et al. ................. 363/20 |
| 5,264,752 A | * | 11/1993 | Savicki ................... 310/316.03 |
| 5,361,014 A | * | 11/1994 | Antone et al. ......... 310/316.03 |
| 5,633,579 A | * | 5/1997 | Kim ........................... 323/222 |
| 6,060,814 A | * | 5/2000 | Hoffmann et al. ..... 310/316.03 |
| 6,147,433 A | * | 11/2000 | Reineke et al. ........ 310/316.03 |
| 6,758,199 B2 | * | 7/2004 | Masters et al. ............. 123/620 |
| 2001/0020804 A1 | | 9/2001 | Freudenberg et al. ....... 307/109 |

FOREIGN PATENT DOCUMENTS

| | | | | |
|---|---|---|---|---|
| DE | 195 05 417 A1 | 8/1996 | ............ H02M/3/28 |
| DE | 197 14 610 A1 | 10/1998 | ............ H02N/2/06 |

OTHER PUBLICATIONS

Su–Ho Lee et al,.; Piezoelectric Transformer for Power Converter Operating at High Frequency; IEEE Ultrasonics Symposium; pp. 767–772, 1999.

* cited by examiner

Primary Examiner—Rajnikant B. Patel
(74) Attorney, Agent, or Firm—Baker Botts L.L.P.

(57) ABSTRACT

A converter mounting comprises a memory coil inductance (8), a memory primary capacitor (3) mounted upstream of said coil inductance, and a memory secondary capacitor (4), in particular, a piezoelectric actuator, mounted downstream of said coil inductance. Through control of a primary circuit element (12) and of a secondary circuit element (14), the energy of the memory primary capacitor (3) can be transferred to the memory secondary capacitor (4) and recovered.

26 Claims, 3 Drawing Sheets

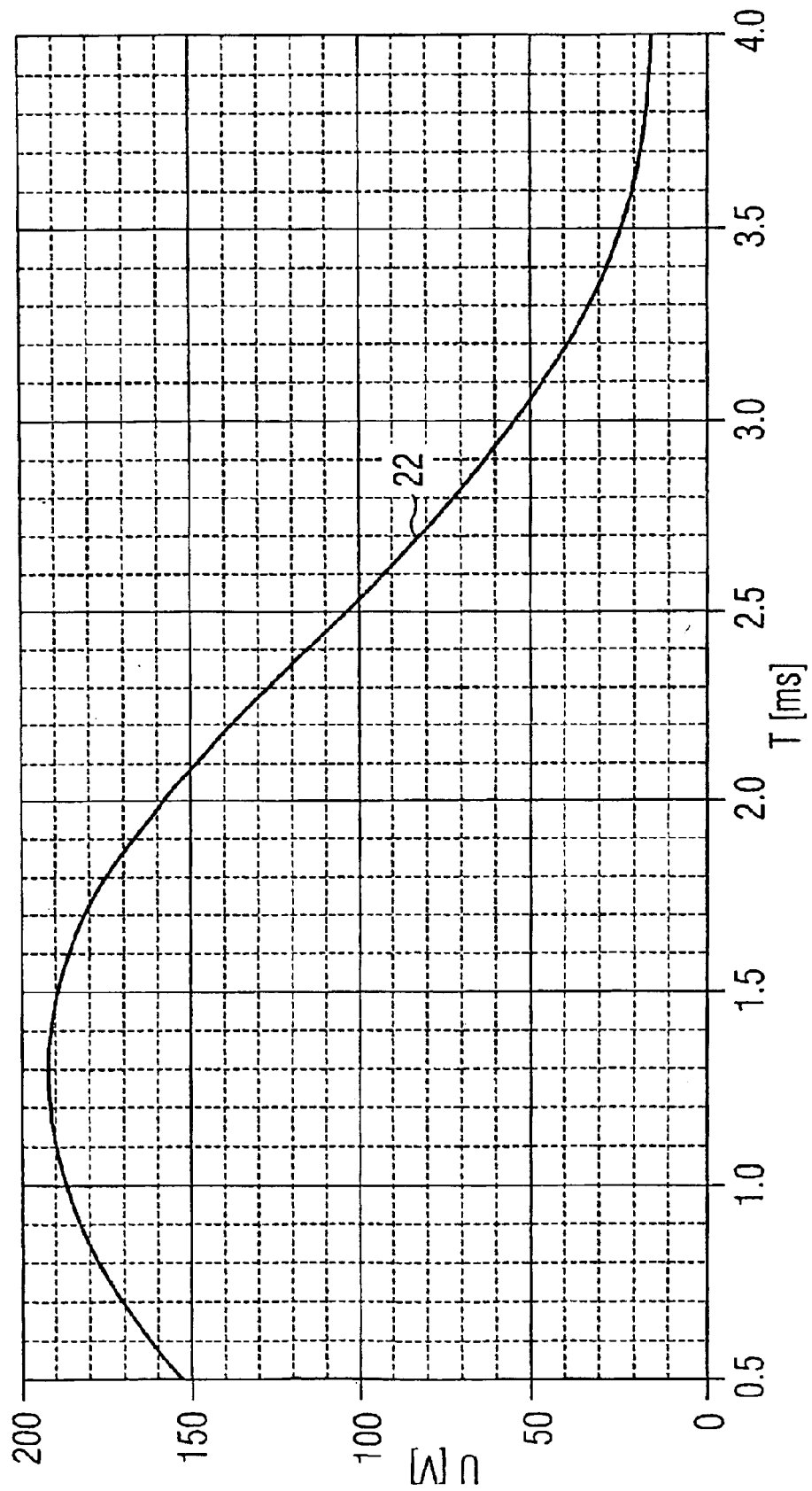

CONVERTER CIRCUIT

CROSS REFERENCE TO RELATED APPLICATION

This application is a continuation of copending International Application No. PCT/DE02/03496 filed Sep. 17, 2002 which designates the United States, and claims priority to German application No. 101 47 168.8 filed Sep. 25, 2001.

TECHNICAL FIELD OF THE INVENTION

The invention relates to a converter circuit with a storage inductor that is connected at one end to a reference potential and at the opposite input end to a supply connection and at the output end to a secondary storage capacitor, the output of which is connected to the reference potential.

DESCRIPTION OF THE RELATED ART

Due to the urgent requirement for fuel-saving engines, direct-injection spark-ignition engines with a lean-burn characteristic are presently being developed, because with these engines an average fuel saving of up to 15% can be expected compared with conventional engines controlled to $\lambda=1$ with direct injection of the fuel into the inlet manifold. A charge stratification takes place in the combustion chamber under partial load. This means that the combustion chamber is divided into two zones, i.e. a first zone with a combustible fuel-air mixture close to the spark plug and a second zone consisting of air and residual exhaust gas that surrounds the first zone and provides thermal insulation against the wall of the combustion chamber. The stratified charge produces an extremely late injection time point during the compression phase of the engine and an extremely short injection time of typically 0.5 ms. The transition to homogenous operation takes place with increasing engine load. Then the fuel is injected very early during the induction phase, to guarantee a good mixture of air and fuel.

It is particularly advantageous to use piezoelectric actuators, or other electrostrictive actuators manufactured using multilayer technology, to actuate the injection valves because these react almost without delay. These piezoelectric actuators or electrostrictive actuators manufactured using a multilayer technology have a layer stack consisting of a material whose expansion changes in the longitudinal direction when an external voltage is applied. Injection valves actuated by piezoelectric actuators or electrostrictive actuators can be controlled independently of the piston movement and therefore also have the advantage that they enable short switching times to be realized.

Technically, a piezoelectric actuator is a capacitor that is charged by the application of an external electric voltage. This causes the energy to be stored in the piezoelectric actuator. Because the piezoelectric actuator for injection applications is typically charged and discharged at frequencies between 10 and 500 Hz, there is an interest in recovering the energy stored in the piezoelectric actuator when the piezoelectric actuator is discharged. Therefore, circuits are necessary with the aid of which a piezoelectric actuator can be operated as loss-free as possible. This, of course, also applies to the electrostrictive actuators.

From Tietze, Schenk, "Halbleiter-Schaltungstechnik, $9^{th}$ edition, page 563" an inverting converter is known that includes a storage inductor, one end of which is connected to ground. The opposite end of the storage inductor is connected to a switch that alternately connects the opposite end of the storage inductor with an input and an output. A smoothing capacitor is connected at the output parallel to the changeover switch and storage inductor. If the storage inductor is connected through the changeover switch with an input connected to a current source, an inductor current flows through the storage inductor that then retains its direction if the changeover switch switches to the output. Because the inductor current continues to flow, the smoothing capacitor is then charged to negative voltage values if the input voltage is positive.

A transfer of the energy stored in the smoothing capacitor or consumer to the current source is, however, not possible with the known circuit.

SUMMARY OF THE INVENTION

Based on this prior art, the object of the invention is to provide a converter circuit by means of which the energy stored in the secondary storage capacitor can be at least partially recovered.

This objective can be achieved in accordance with the invention in that the input end of the storage inductor is connected upstream of a primary storage capacitor, the input of which can be connected via a primary switching element to the reference potential, and that the secondary storage capacitor is connected in series with the secondary switching element.

A converter circuit may comprise a storage inductor having a first and a second terminal, the first terminal being coupled with a reference potential; a secondary storage capacitor coupled with the second terminal; a primary storage capacitor coupled between an input of the converter and the second terminal, and a primary switching element for coupling the primary storage capacitor with a reference voltage; and a secondary switching element for coupling the secondary storage capacitor with the reference potential.

The primary switching element can be bridged by a diode element polarized in the reverse direction for a supply voltage present at the supply connection. The secondary switching element can be bridged by a diode element polarized in the forward direction for a supply voltage present at the supply connection. The storage inductor can be an air-core inductor. A filter reactor can be connected between the supply connection and primary storage capacitor. The filter reactor can be an air-core inductor. The value of the inductance of the filter reactor can be greater than the value of the inductance of the storage inductor. The primary switching element can be an npn bipolar transistor and the secondary switching element can be a pnp bipolar transistor. The secondary storage capacitor can be an electrostrictive component. The secondary storage capacitor can be a piezoelectric element. The piezoelectric element can be a piezoelectric actuator suitable for actuating valves in an internal combustion engine. The piezoelectric element can be a piezoelectric actuator manufactured using multilayer technology.

In accordance with the invention, an additional primary storage capacitor is arranged at the input. The energy stored in the secondary storage capacitor can be at least partially transferred back to this primary storage capacitor. In particular, it is possible by briefly closing the secondary switching element to build up a current via the storage inductor and the secondary storage capacitor that, when the secondary switching element is then closed, continues to flow and thus charges the primary storage capacitor. In this way, the energy stored in the secondary storage capacitor is at least partially transferred back to the primary storage capacitor.

Furthermore, the converter circuit in accordance with the invention has the advantage that only one single inductor is required for the storage inductor. In particular, no ring-core transformers are required for the converter circuit in accordance with the invention. Therefore, with the converter circuit in accordance with the invention, no energy losses also occur due to the magnetic scatter field. It is also not necessary to provide filter circuits in order to capture the voltage peaks caused by the scatter field. Because energy is required to operate such filter circuits, the use of simple inductors is doubly favorable with regard to efficiency.

In a preferred form of embodiment of the invention, it is provided that the primary switching element is bridged by a diode element polarized in the reverse direction when a supply voltage is present at the supply connection, and the secondary switching element is bridged by a diode polarized in the forward direction when a supply voltage is present at the supply connection.

Because of the diode elements bridging the primary and secondary switching elements, the switching characteristics of the primary and secondary switching elements need not be synchronized. In particular, the voltage at the secondary storage capacitor can be simply increased by operating the primary switching element and reduced by operating the secondary switching element.

With a preferred form of embodiment, an air coil is used for the storage inductor. Cost savings can be achieved by doing away with the bulky ferrite cores and expensive nanocrystal magnetic materials, and the converter circuit can overall be of smaller, lighter construction.

BRIEF DESCRIPTION OF THE DRAWINGS

The invention is explained in detail in the following using the accompanying drawings. These are as follows:

FIG. 4 A measurement of a sinusoidal voltage present at the secondary storage capacitor.

DETAILED DESCRIPTION OF THE PREFERRED EMBODIMENTS

Figure 1:
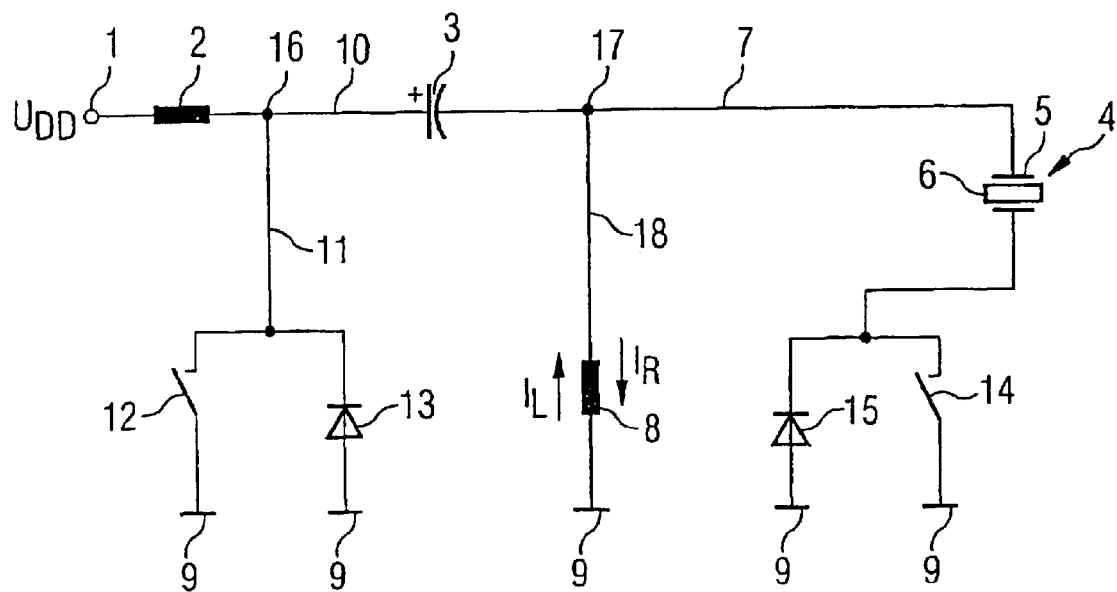
FIG. 1 A first example of an embodiment of a converter circuit in accordance with the invention.

The converter circuit in FIG. 1 has a supply connection 1 downstream of which a filter reactor 2 is connected. The end of the filter reactor 2 away from the supply connection 1 is connected to a primary storage capacitor 3, for example a condenser, and to a secondary storage capacitor 4, for example a piezoelectric actuator. These piezoelectric actuators have a stack of piezoelectric material 6 embedded between electrodes 5, the expansion of which changes when an external voltage is applied. For simplicity, only a single layer of the piezoelectric material with the associated electrodes 5 is shown in FIG. 4.

At a line 7 between the primary storage capacitor 3 and the secondary storage capacitor 4, a storage inductor 8 is connected at its end away from line 7 is connected to ground 9. From a line 10 connecting the filter reactor 2 with the primary storage capacitor 3, a line 11 then branches off leading to a primary switching element 12. The end of the primary switching element 12 away from line 10 is also connected to ground 9. Furthermore, the primary switching element 12 is bridged by a diode 13 that is polarized in the reverse direction when a supply voltage UDD is present at supply connection 1. A secondary switching element 14, that is also connected to ground 9 and bridged by a diode 15, is connected in series with the secondary storage capacitor 4. In this case, the diode 15 is polarized in the forward direction when a supply voltage UDD is present at supply connection 1.

The function of the circuit is described in detail in the following.

When a supply voltage UDD is applied at supply connection 1 and the primary switching element is open, the primary storage capacitor 3 first charges until a junction 16 between lines 10 and 11 is at potential UDD. A junction 17 between line 7 and a line 18 leading to the storage inductor 8 is at ground potential at this time point.

When the primary switching element 12 is closed, junction 16 is connected to ground potential. This causes junction 17 to move to a potential −UDD, so that, due to the storage inductor 8, a current $I_L$ flows through the storage inductor 8, the primary storage capacitor 3 and the primary switching element 12. When the primary switching element 12 opens, the storage inductor 8 maintains the current $I_L$ and thus charges the secondary storage capacitor 4. In this case, the current $I_L$ flows through the secondary storage capacitor 4 and diode 15. The secondary storage capacitor is now charged, which means that the electrode at the ground end of electrodes 5 is now at negative potential below the ground potential. Diode 15 thus prevents the secondary storage capacitor 4 discharging.

To discharge the secondary storage capacitor 14, the secondary switching element 14 is closed, thus enabling a current $I_R$ to flow through the secondary switching element 14, the secondary storage capacitor 4 and the storage inductor 8. After the secondary switching element 14 opens, the storage inductor 8 maintains the current $I_R$ and thus charges the primary storage capacitor 3. In this case, a current flows via the primary storage capacitor 3 and primary diode 13. In this way, the charge stored in the secondary storage capacitor 4 is at least partly transferred to the primary storage capacitor. Therefore, the energy stored in the secondary storage capacitor 4 is not completely lost but is instead re-stored in the primary storage capacitor 3.

The primary diode 13 and secondary diode 15 are not absolutely necessary for the functioning of the circuit. It is also basically conceivable for the primary switching element 12 and secondary switching element 14 to always close by means of a suitable control element if current should flow through the primary switching element 12 and secondary switching element 14, and then to always open if the connection to ground should be broken. However, this requires a substantial circuit cost, so that the converter circuit shown in FIG. 1 represents a substantially simpler solution.

Naturally, no mechanical switches are required for the primary switching element 12 and secondary switching element 14. For the example shown in FIG. 1, an npn bipolar transistor or n channel field-effect transistor could be used for the primary switching element 12. For the secondary switching element 14 in the example of an embodiment shown in FIG. 1, a pnp bipolar transistor or p channel field-effect transistor could be used for the secondary switching element.

It should be noted that IGBTs (Isolated Gate Bipolar Transistors) can also be used instead of the bipolar transistors and field-effect transistors.

The use of air-core inductors is preferred for the storage inductors 8 and filter reactors 2, whereby the value of the inductance of the filter reactor 2 should be greater than the value of the inductance of the storage inductor 8, to prevent interference pulses in the supply system being fed in. The use of air-core inductors for the storage inductor 8 and filter reactor 2 has the advantage that the converter circuit can be of a small, cost-saving design, because bulky or expensive magnetic cores can be omitted.

The converter circuit shown in FIG. 1 can be used both as an upwards and downwards converter. With only one storage inductor 8 and without a transformer, the converter circuit enables an output voltage to be generated that can be either larger or smaller than the supply voltage. In the experiment, it was possible to generate output voltages between 0 and 400 V from supply voltages between 12 and 80 V.

Furthermore, with the converter circuit shown in FIG. 1, the current $I_L$ and also the current $I_R$ flow through the storage inductor 8. A single current measuring device for the current through the storage inductor 8 therefore enables the charge flowing to the secondary storage capacitor 4 and also the charge flowing from the secondary storage capacitor 4 to be determined.

Figure 2:
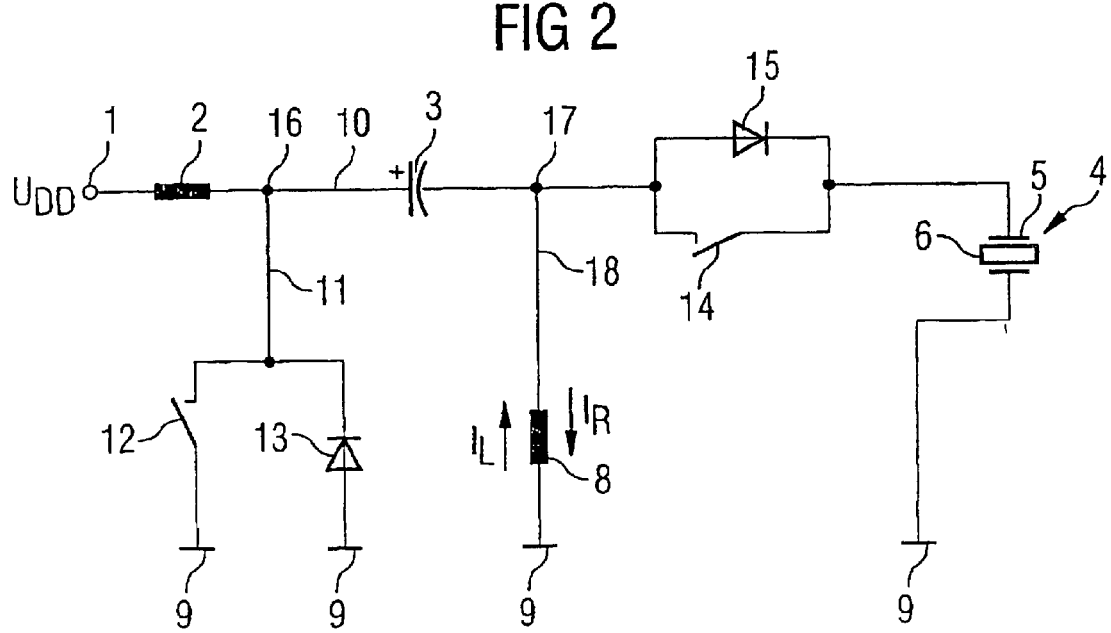
FIG. 2 A second example of an embodiment of a converter circuit in accordance with the invention.

FIG. 2 shows a further example of an embodiment of a converter circuit. With this example of an embodiment, the sequence of switching element 14 and associated secondary diode 15 is changed compared with the example of an embodiment shown in FIG. 1. This is particularly important for applications where the secondary storage capacitor 4 is to be connected to ground 9 for safety reasons. This enables the housing of a piezoelectric actuator used as a secondary storage capacitor 4 to be grounded. However the example of an embodiment shown in FIG. 2 has a disadvantage compared to the example of an embodiment shown in FIG. 1 in that a highside switch must be used for the secondary switching element 14, because the potential at the secondary switching element 14 is floating.

In all other respects, the description given for the example of an embodiment shown in FIG. 1 applies.

Figure 3:
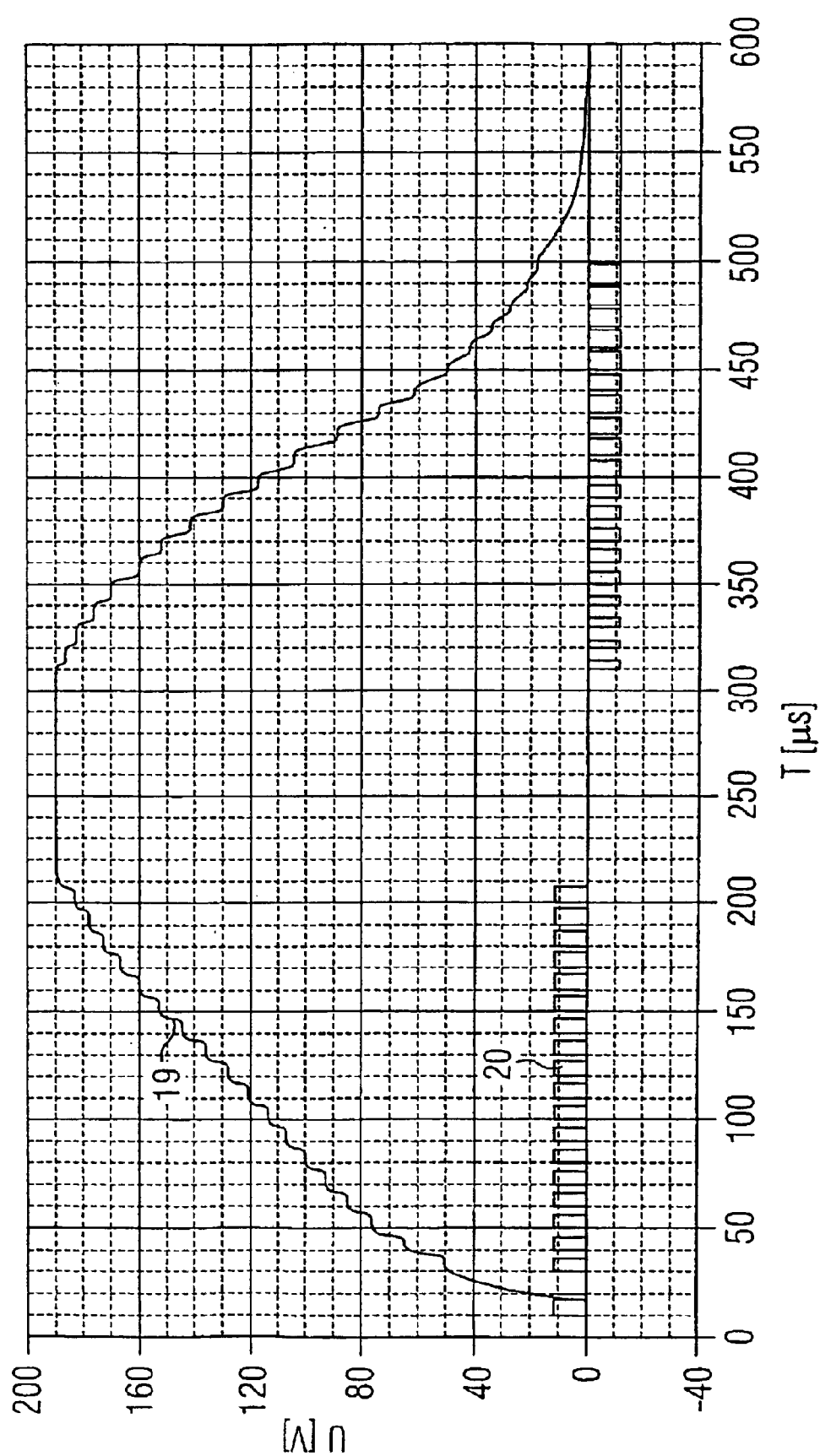
FIG. 3 A diagram showing the control signals present at the primary and secondary switching elements and the voltage present at the secondary storage capacitor.

FIG. 3 is a diagram in which a curve 19 represents the voltage present at the secondary storage capacitor 4. Furthermore, the diagrams in FIG. 3 show control pulses 20 that actuate the primary switching element 12. The diagram in FIG. 3 also shows control pulses 21 that are used to control the secondary switching element 14. The increase in the charge in the secondary storage capacitor 4, and thus the voltage at the secondary storage capacitor, can be controlled by the duration of the control pulses 20. The duration of the control pulses 20 and 21 in this case vary relative to the charge state of the secondary storage capacitor 4 and the required voltage increase. The discharge of the secondary storage capacitor 4 can be similarly controlled by the control pulses 21 at the secondary switching element 14. In this case also, the duration of the control pulses 21 depends on the charge state of the secondary storage capacitor 14 and the required voltage drop.

If a sufficiently small pulse duration is chosen, a quasi-continuous rise and fall of the voltage through the secondary storage capacitor results. A case of this kind is shown in FIG. 4, in which a curve 22 represents the voltage characteristic at the secondary storage capacitor 4. In this case, the pulse rate was in the 100 kHz range.

With the converter circuits shown here, a predetermined voltage characteristic can be precisely generated at the secondary storage capacitor 4 from the low d.c. voltages present in the supply system of a vehicle. In this case, other peak voltages of more than several 100 V can be achieved. A particular advantage in this case is also the high efficiency of the circuit, because the energy stored in the secondary storage capacitor 4, i.e. the piezoelectric actuator, can be recovered. Because the converter circuits shown in FIGS. 1 and 2 also have no transformers, no filters, that dampen any voltage peaks caused by the scatter field in the ring core, are provided.

As already stated repeatedly, the converter circuit is particularly suitable for operating piezoelectric or electrostrictive components. This can be a piezoelectric actuator for operating an injection valve in a direct-injection engine or a piezoelectric motor.

We claim:

1. A converter circuit comprising a storage inductor, one end of which is connected to a reference potential and an opposite end is coupled to a supply connection and connected to a secondary storage capacitor, an output end of which is coupled to the reference potential, wherein a primary storage capacitor is connected to the input of the storage inductor, an input of the primary storage capacitor can be connected to the reference voltage through a primary switching element and the secondary storage capacitor is connected in series with a secondary switching element.

2. The converter circuit in accordance with claim 1, wherein the primary switching element is bridged by a diode element polarized in the reverse direction for a supply voltage present at the supply connection.

3. The converter circuit in accordance with claim 1, wherein the secondary switching element is bridged by a diode element polarized in the forward direction for a supply voltage present at the supply connection.

4. The converter circuit in accordance with claim 1, wherein the storage inductor is an air-core inductor.

5. The converter circuit in accordance with claim 1, wherein a filter reactor is connected between the supply connection and primary storage capacitor.

6. The converter circuit in accordance with claim 5, wherein the filter reactor is an air-core inductor.

7. The converter circuit in accordance with claim 1, wherein the value of the inductance of the filter reactor is greater than the value of the inductance of the storage inductor.

8. The converter circuit in accordance with claim 1, wherein the primary switching element is an npn bipolar transistor.

9. The converter circuit in accordance with claim 1, wherein the secondary switching element is a pnp bipolar transistor.

10. The converter circuit in accordance with claim 1, wherein the secondary storage capacitor is an electrostrictive component.

11. The converter circuit in accordance with claim 1, wherein the secondary storage capacitor is a piezoelectric element.

12. The converter circuit in accordance with claim 11, wherein the piezoelectric element is a piezoelectric actuator suitable for actuating valves in an internal combustion engine.

13. The converter circuit in accordance with claim 11, wherein the piezoelectric element is a piezoelectric actuator manufactured using multilayer technology.

14. A converter circuit comprising
a storage inductor having a first and a second terminal, the first terminal being coupled with a reference potential;
a secondary storage capacitor coupled with the second terminal;

a primary storage capacitor coupled between an input of the converter and the second terminal, and a primary switching element for coupling the primary storage capacitor with a reference voltage; and a secondary switching element for coupling the secondary storage capacitor with the reference potential.

15. The converter circuit in accordance with claim 14, wherein the primary switching element is bridged by a diode element polarized in the reverse direction for a supply voltage present at the input of the converter.

16. The converter circuit in accordance with claim 14, wherein the secondary switching element is bridged by a diode element polarized in the forward direction for a supply voltage present at the input of the converter.

17. The converter circuit in accordance with claim 14, wherein the storage inductor is an air-core inductor.

18. The converter circuit in accordance with claim 14, wherein a filter reactor is connected between the input of the converter and primary storage capacitor.

19. The converter circuit in accordance with claim 18, wherein the filter reactor is an air-core inductor.

20. The converter circuit in accordance with claim 14, wherein the value of the inductance of the filter reactor is greater than the value of the inductance of the storage inductor.

21. The converter circuit in accordance with claim 14, wherein the primary switching element is an npn bipolar transistor.

22. The converter circuit in accordance with claim 14, wherein the secondary switching element is a pnp bipolar transistor.

23. The converter circuit in accordance with claim 14, wherein the secondary storage capacitor is an electrostrictive component.

24. The converter circuit in accordance with claim 14, wherein the secondary storage capacitor is a piezoelectric element.

25. The converter circuit in accordance with claim 24, wherein the piezoelectric element is a piezoelectric actuator suitable for actuating valves in an internal combustion engine.

26. The converter circuit in accordance with claim 24, wherein the piezoelectric element is a piezoelectric actuator manufactured using multilayer technology.

\* \* \* \* \*